US011300069B2

(12) United States Patent
Moeckly et al.

(10) Patent No.: US 11,300,069 B2
(45) Date of Patent: Apr. 12, 2022

(54) SELF-GENERATING ENGINE-SPECIFIC HEALTH MONITORING MODEL FROM GENERIC MODEL BASE

(71) Applicant: HONEYWELL INTERNATIONAL INC., Morris Plains, NJ (US)

(72) Inventors: Kevin Moeckly, Chandler, AZ (US); Christopher Gill, Gilbert, AZ (US); Richard Ling, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 546 days.

(21) Appl. No.: 16/202,142

(22) Filed: Nov. 28, 2018

(65) Prior Publication Data
US 2020/0165995 A1  May 28, 2020

(51) Int. Cl.
| | | |
|---|---|---|
| *F02D 41/22* | (2006.01) | |
| *B64D 31/00* | (2006.01) | |
| *G07C 5/02* | (2006.01) | |
| *G05B 13/04* | (2006.01) | |
| *B64F 5/60* | (2017.01) | |

(Continued)

(52) U.S. Cl.
CPC ........... *F02D 41/22* (2013.01); *B64D 31/00* (2013.01); *B64F 5/60* (2017.01); *G05B 13/041* (2013.01); *G06N 20/00* (2019.01); *G07C 5/006* (2013.01); *G07C 5/02* (2013.01)

(58) Field of Classification Search
CPC ........... F02D 41/22; B64F 5/60; G06N 20/00; B64D 31/00; G05B 13/041; G07C 5/006; G07C 5/02

USPC .......................................................... 701/3
See application file for complete search history.

(56) References Cited

U.S. PATENT DOCUMENTS

| | | | | |
|---|---|---|---|---|
| 4,275,557 A | * | 6/1981 | Marvin | ..................... F02C 9/28 60/773 |
| 7,216,071 B2 | | 5/2007 | Volponi | |
| 8,600,917 B1 | | 12/2013 | Schimert et al. | |

(Continued)

FOREIGN PATENT DOCUMENTS

| | | |
|---|---|---|
| CA | 2833754 A1 | 6/2014 |
| EP | 3217242 A1 | 9/2017 |
| WO | 2016025887 | 2/2016 |

*Primary Examiner* — Isaac G Smith
(74) *Attorney, Agent, or Firm* — Lorenz & Kopf, LLP (57) ABSTRACT

A method for self-generating an engine-specific model in an engine health monitoring system is provided. The method comprises generating a generic engine model including a generic physics-based model for each of a plurality of engine components in the specific engine; capturing a plurality of observed engine component parameters for each of the plurality of engine components and a plurality of observed environmental parameters during one or more pre-planned training missions; and training an engine-specific model using the plurality of observed engine component parameters and the plurality of environmental parameters captured during the one or more pre-planned training missions, wherein the engine-specific model includes an engine-specific physics-based model for each of the plurality of engine components in the specific engine. Each engine-specific physics-based model for an engine component is configured for use in predicting one or more engine component parameters using a second plurality of observed environmental parameters captured during an operational mission.

20 Claims, 5 Drawing Sheets

(51) Int. Cl.
  *G06N 20/00* (2019.01)
  *G07C 5/00* (2006.01)

(56) References Cited

U.S. PATENT DOCUMENTS

| | | |
|---|---|---|
| 9,376,983 B2 | 6/2016 | Moeckly et al. |
| 2002/0184178 A1 | 12/2002 | Tasooji et al. |
| 2007/0118271 A1* | 5/2007 | Wiseman .......... G05B 23/0254 701/100 |
| 2010/0023238 A1* | 1/2010 | Adibhatla .......... G05B 23/0289 701/100 |
| 2011/0153295 A1 | 6/2011 | Yerramalla et al. |
| 2014/0163838 A1* | 6/2014 | Moeckly .................. F02C 9/00 701/100 |
| 2017/0114725 A1* | 4/2017 | Holt .......................... F01D 5/02 |
| 2017/0336288 A1 | 11/2017 | Schwarz et al. |
| 2018/0102000 A1 | 4/2018 | Vala et al. |
| 2018/0137219 A1* | 5/2018 | Goldfarb ................ G06N 20/00 |
| 2018/0268288 A1 | 9/2018 | Vandike et al. |
| 2018/0297718 A1 | 10/2018 | Adibhatla |
| 2019/0032508 A1* | 1/2019 | Wang ..................... H04N 5/332 |

* cited by examiner

FIG. 5

SELF-GENERATING ENGINE-SPECIFIC HEALTH MONITORING MODEL FROM GENERIC MODEL BASE

TECHNICAL FIELD

The present invention generally relates to maintenance systems, and more particularly relates to systems and methods for generating an engine-specific diagnostic model from a generic model for turbine engine systems.

BACKGROUND

An engine-specific gas turbine engine model typically consists of detailed maps/models of every component in the engine including the compressor, combustor, turbine, ducts, secondary flow, bleeds, parasitic losses and more to model the actual physics of a specific engine. Developing an accurate engine-specific model can take years to develop and fine tune through component rig testing, altitude testing, and full engine testing. Oftentimes however, the engine is rarely operated at extreme conditions in the flight envelope, but rather experiences similar inlet conditions day in and day out Hence, it is desirable to provide systems and methods for generating engine models that can be developed more quickly and allow the flight conditions to automatically tune the model for a given flight condition and mission profile. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for self-generating engine-specific models in an engine health monitoring system is provided. The method includes identifying the configuration of an engine in a vehicle, wherein the identifying includes identifying engine components in the engine; generating, using a processor, a generic engine model that includes a generic physics-based model for each of a plurality of engine components in the specific engine; capturing, using aircraft sensors, a plurality of observed engine component parameters for each of the plurality of engine components and a plurality of observed environmental parameters during one or more pre-planned training missions; and training, using a processor, an engine-specific model using the plurality of observed engine component parameters and the plurality of environmental parameters captured during the one or more pre-planned training missions, wherein the engine-specific model includes an engine-specific physics-based model for each of the plurality of engine components in the specific engine. Each engine-specific physics-based model for an engine component is configured for use in predicting one or more engine component parameters using a second plurality of observed environmental parameters captured using aircraft sensors during an operational mission performed by the vehicle. The engine health monitoring system is configured to identify a specific engine component for maintenance action when one or more of a second plurality of observed engine component parameters related to the specific engine component and captured using aircraft sensors during the operational mission deviates from predicted engine component parameters for the specific engine component during the operational mission by a predetermined amount.

In another embodiment, a system for self-generating engine-specific models in an engine health monitoring system is provided. The system includes a generic engine model generator and a specific engine model generator. The generic engine model generator includes one or more processors configured by programming instructions on computer readable media to generate a generic engine model that includes a generic physics-based model for each of a plurality of engine components in a specific engine in the vehicle. The specific engine model generator includes one or more processors configured by programming instructions on computer readable media to: receive a plurality of observed engine component parameters for each of the plurality of engine components and a plurality of observed environmental parameters captured during one or more pre-planned training missions; and train an engine-specific model using the plurality of observed engine component parameters and the plurality of environmental parameters captured during the one or more pre-planned training missions, wherein the engine-specific model includes an engine-specific physics-based model for each of the plurality of engine components in the specific engine. Each engine-specific physics-based model for an engine component is configured for use in predicting one or more engine component parameters using a second plurality of observed environmental parameters captured during an operational mission performed by the vehicle. The engine health monitoring system is configured to identify a specific engine component for maintenance action when one or more of a second plurality of observed engine component parameters related to the specific engine component and captured during the operational mission deviates from predicted engine component parameters for the specific engine component during the operational mission by a predetermined amount.

In another embodiment, a method for monitoring engine health, includes: determining the configuration of a specific engine in a vehicle; generating a generic engine model that includes a generic physics-based model for each of a plurality of engine components in the specific engine; capturing a plurality of observed engine component parameters for each of the plurality of engine components and a plurality of observed environmental parameters during one or more pre-planned training missions; training an engine-specific model using the plurality of observed engine component parameters and the plurality of environmental parameters captured during the one or more pre-planned training missions, wherein the training includes generating an engine-specific, physics-based component model for each specific component in the specific engine by adjusting the generic physics-based model for the specific component using observed engine component parameters for the specific component and captured environmental parameters, and wherein the adjusting includes generating sets of scalars for component maps. The method further includes capturing a second plurality of observed engine component parameters and a second plurality of observed environmental parameters during an operational mission performed by the vehicle; predicting a plurality of engine component parameters using the second plurality of observed environmental parameters and the engine-specific, physics-based component models for the specific components in the specific engine; comparing the predicted engine component parameters with the second plurality of observed engine component parameters; and identifying a specific component for maintenance action when one or more of the plurality of the second plurality of observed engine component parameters related to the specific component deviates from predicted engine component parameters for the specific component by a predetermined amount.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, database systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, methods, and techniques for creating engine-specific models for onboard and offboard gas turbine engine applications without the need of a fully defined aero-thermal model. The subject matter described herein discloses apparatus, systems, methods, and techniques for a streamlined modeling approach that leverages lessons learned across products. The subject matter described herein discloses apparatus, systems, methods, and techniques that could be used on different platforms with different engine manufacturers. The subject matter described herein discloses apparatus, systems, methods, and techniques wherein permissions or proprietary modeling systems or information from engine OEMs would not be needed for implementation. The subject matter described herein discloses apparatus, systems, methods, and techniques for a model that would self-generate, and be grounded in proven physics-based modeling techniques.

Figure 1:
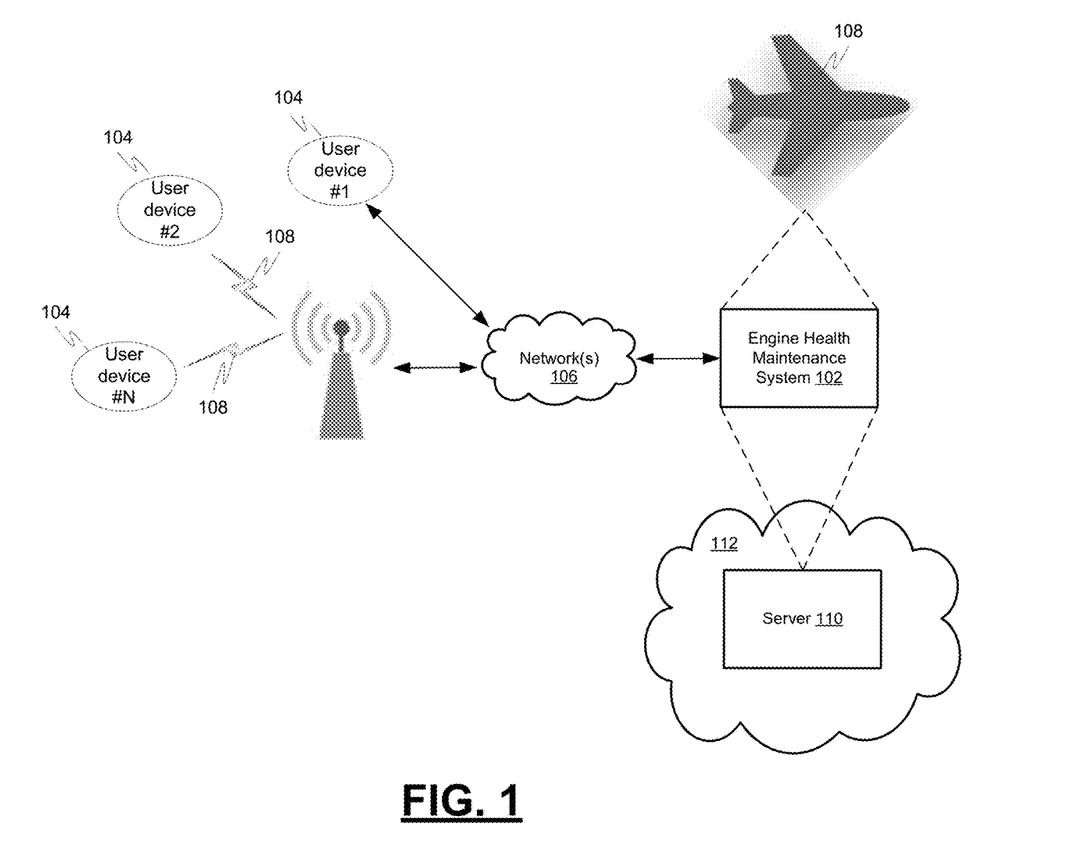
FIG. 1 is a block diagram depicting an example environment in which an example engine health monitoring system may be deployed, in accordance with some embodiments.

FIG. 1 is a block diagram depicting an example environment 100 in which an example engine health monitoring system 102 may be deployed. In the example environment 100, one or more maintenance personnel (e.g., maintainers) using user devices 104, such as smart phones, tablets, laptops, etc., may, via a network 106, access an engine health monitoring system 102 to retrieve information to assist in resolving maintenance matters relating to an aircraft engine, such as a gas turbine engine, on an aircraft 108. The example engine health monitoring system 102 is configured with engine-specific, physics-based component models for the specific components in the specific engine on the aircraft 108. Using the engine-specific, physics-based component models, the example engine health monitoring system 102 is configured to predict a plurality of engine component parameters, such as speeds, temperatures, pressures, airflows, fuel flow, torque, etc., at different stages during an operational flight based on a plurality of observed environmental parameters, such as altitude, temperature, humidity, and other weather conditions. The example engine health monitoring system 102 is further configured to compare the predicted engine component parameters with observed engine component parameters at the appropriate flight stages and identify one or more specific engine components for maintenance action when one or more of the plurality of observed engine component parameters related to the specific components deviates from predicted engine component parameters for the specific components by a predetermined amount. The example engine health monitoring system 102 may be located on board the aircraft 108 or off-board the aircraft, for example, on a server 110 that is accessible via a private network 112.

The user devices 104 may communicate with the example engine health monitoring system 102, for example, via a cellular communication channel 108 over a cellular network such as 4G LTE or 4G LTE-V2X, a public network 106, and/or a private network 112. Communication between a user device 104 and the example engine health monitoring system 102 may be App-based (e.g., using an application program executing on the user device), browser based, or both.

The example engine health monitoring system 102 includes a self-generating engine-specific health monitoring model that generates an engine-specific model from a generic model base. The self-generating engine-specific health monitoring model is configured to receive a plurality of observed engine component parameters for a plurality of engine components captured during one or more training pre-planned missions and a plurality of observed environmental parameters captured during the one or more pre-planned training missions. The self-generating engine-specific health monitoring model is further configured to start with a base model and train an engine-specific model using the base model, the plurality of observed engine component parameters and the plurality of environmental parameters captured during the one or more pre-planned training missions. The engine-specific model after training includes an engine-specific physics-based model for each of the plurality of engine components in the specific engine.

Figure 2:
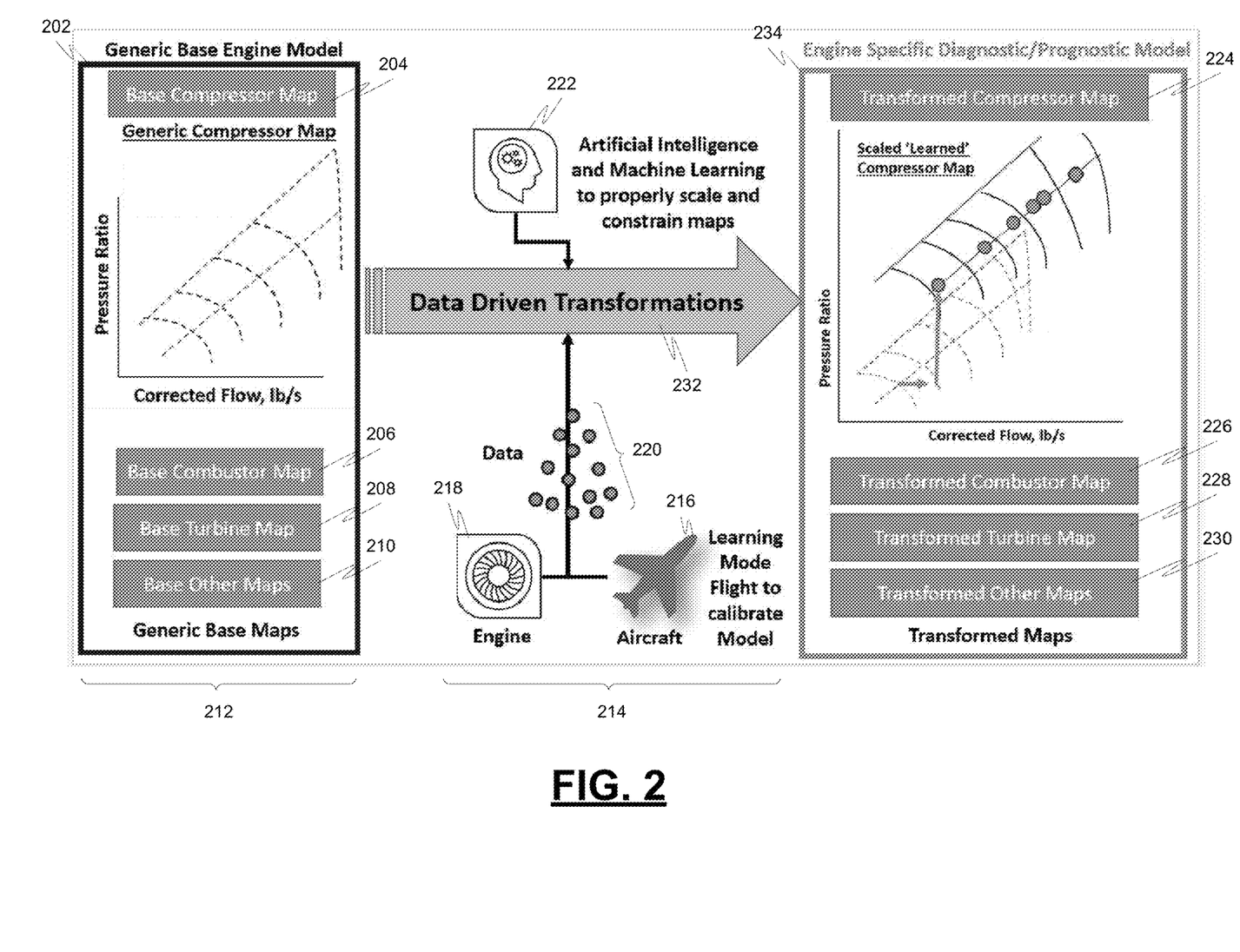
FIG. 2 is a block diagram depicting example stages in self-generating an engine-specific health monitoring model from a generic model base for an engine, in accordance with some embodiments.

FIG. 2 is a block diagram depicting example stages in self-generating an engine-specific health monitoring model from a generic model base for an engine 218. A generic base engine model 202 is provided. The generic base engine model 202 includes a nominal-shaped engine model with designations for the number and types of engine components used in the engine. The number and types of engine components may include the number of compressor stages, bleed ports, combustor, ducts, and turbine stages to be modeled, along with the available level of instrumentation. The number and types of engine components are used to identify generic base maps that are included in the generic base engine model 202. The example generic base engine model 202 includes a base compressor map 204, a base combustor map 206, a base turbine map 208, and base maps 210 for other components. In this example, the provision of the generic base engine model 202 is in a "start-up" mode 212 where initialization and specification take place. It should be understood that there can be many compressor stages (or maps), several turbine stages (or maps), as well as multiple ducts, bleed ports, and power draws.

Next, a "learning mode" 214 is activated wherein sets of scalars for transforming the base models to engine-specific models are created. The generated set of scalars is used to scale entire map sets, not just in a particular area of a map. In the learning mode 214, an aircraft 216, on which the engine 218 resides, is flown on one or more learning mode flights. Through the learning mode flight(s), an aircraft operator could potentially fly the aircraft 216 through scenarios similar to those that the aircraft 216 will experience in real life, and consequently create a model specific to that environment and conditions. During the learning mode flight(s), aircraft data 220 including aircraft environmental data (such as altitude, temperature, airspeed, weather data, and others) and engine component data (such as pressures, temperatures, fuel flow, airflow, torque, speed, and others) are captured via various aircraft sensors, such as airspeed, altitude, temperature, pressure, flow, torque, fuel flow, and other sensors and recorded.

Map generation, (e.g., generating the engine-specific maps) is accomplished using Artificial Intelligence (AI) (e.g., using Watson I'm or other systems) 222 and machine learning techniques to reshape the generic, dimensionless component maps (204, 206, 208, 210) into specific component maps (224, 226, 228, 230) through a rule-based transformation 232 that may guarantee that no physics laws and known constraints are violated. The rule-based transformation 232 can also select the best (data-driven) scaling method from a group of candidates based on the type of component. The result of the rule-based transformation 232 is the generation of an engine-specific diagnostic/prognostic model 234 containing engine-specific component maps (224, 226, 228, 230).

The engine-specific diagnostic/prognostic model 234 containing engine-specific component maps (224, 226, 228, 230) can be used, e.g., in a diagnostic mode, to predict engine component parameter values when the aircraft 216 is performing non-learning mode flights. The generated scalars for the engine-specific component maps (224, 226, 228, 230) should be of the same absolute magnitude that they would be if derived from a map set that had been based on years of rig and engine testing. An engine health monitoring system that uses the engine-specific diagnostic/prognostic model 234 can identify potential engine component problems when the predicted component parameter values deviate from actually experienced component parameter values by more than a predetermined amount.

An advantage that may be achieved from techniques described herein is that the base model is generic (e.g., may not be specific to a particular aircraft or engine with which the base model is to be used and not derived from experimental or test data for the particular aircraft or engine) and can be used across multiple product lines. Efforts towards generating a robust base model can also be shared.

With the techniques described herein, base model maps would be generic with typical representative smooth shapes. Compressor map shapes can quickly be modified with flow, pressure ratio, and efficiency scalars to mimic the test engine. Turbine maps could be similarly scaled. User input of available instrumentation would define the diagnostic solver matrix. The initial engine-specific model would be quickly created and then of course would continue to update itself if the application requires it, just as current applications do with engine specific model updates.

In an example use case, an aircraft could be delivered to a customer. The customer could put a diagnostic model in a "learning mode," fly a ferry mission from Airport1 to Airport2 and back, and turn off the learning mode. The diagnostic model could self-generate an engine-specific model that is directly applicable to how that engine will be used. During the learning mode, the dimensionless engine component shapes are re-molded or auto-tuned and receive numerical dimensions to represent the physical engine data acquired.

The customer could next switch the diagnostic model to a "diagnostic mode" and repeat the same ferry mission moments later. The predicted component parameters from the engine-specific model should exactly match the component parameters for the physical engine conditions. This results in a very accurate prediction of speed, temperature, and pressure measurements on the physical hardware. As flight conditions and prevailing ambient condition change, the model would fine tune scalars to account for these known effects on engine performance. If there was a true shift in engine performance, such as flying through a sandy environment resulting in compressor deterioration, the model would detect an anomaly in the compressor based on prior knowledge from the 'learning model' and would flag a problem to the customer with a corrective action (e.g., inspect compressor for damage and water wash compressor if dirty).

Figure 3:
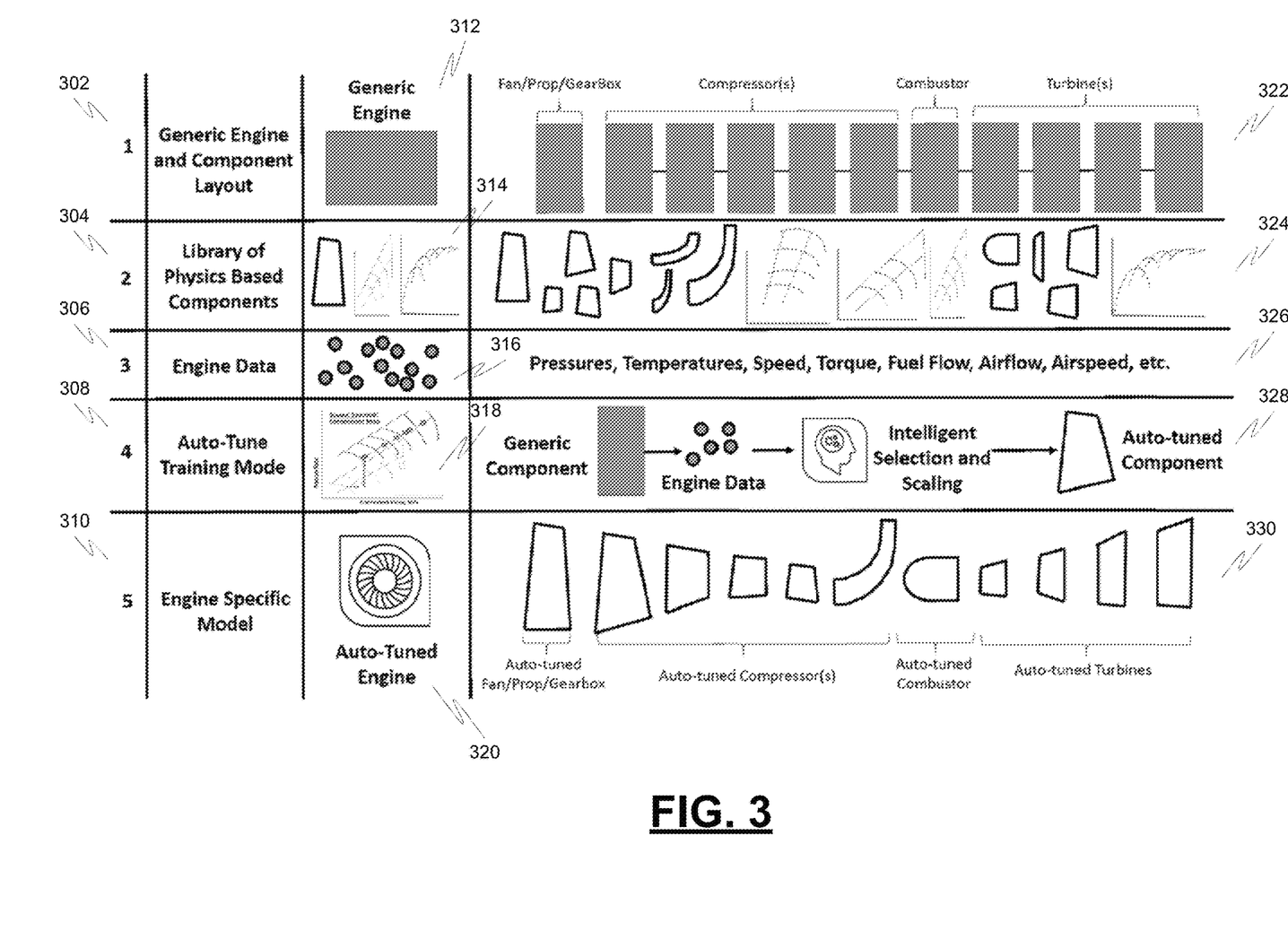
FIG. 3 is another block diagram depicting example stages in self-generating an engine-specific health monitoring model from a generic model base, in accordance with some embodiments.

FIG. 3 is another block diagram depicting example stages in self-generating an engine-specific health monitoring model from a generic model base. Five stages are depicted in this example. In a first stage 302, a generic engine 312 and component layout 322 are identified for a specific engine. This involves identifying the number and type of engine components in the specific engine and the layout of the component for the specific engine. A standard engine configuration is chosen initially as a best representation of the layout of engine components and instrumented stages.

In a second stage 304, a library of physics-based components 314 is accessed which includes generalized, non-dimensional, applicable aero-thermal physics-based component mapping forms 324. Appropriate generalized, physics-based component mapping forms 324 are chosen from the library of physics-based components 314 to form a generic engine model based on the identified component layout 322.

In a third stage 306, available engine, environmental, and aircraft instrumentation data and information 316 are collected during one or more training missions. The collected data and information 316 may include specific data 326 such as pressures, temperatures, speed, torque, fuel flow, airflow, airspeed, and others. The collected data and information 316 will be used for training the generic engine model into an engine-specific model.

In a fourth stage 308, the system uses artificial intelligence and machine learning techniques to auto-tune or train the engine-specific model 318. The engine-specific model 318 learns about the physical aspects of the specific engine using the collected data and information 316 and 'tunes' each engine-specific component model 328 to match the measured data 316. The learning algorithms iterates through all available maps 328 and finds the best fit for each engine-specific component model 328 based on the data.

In a fifth stage 310, a resultant engine-specific model 320 with fine-tuned engine specific component maps 330 is ready for standard on-board or off-board engine diagnostic and prognostic uses.

Figure 4:
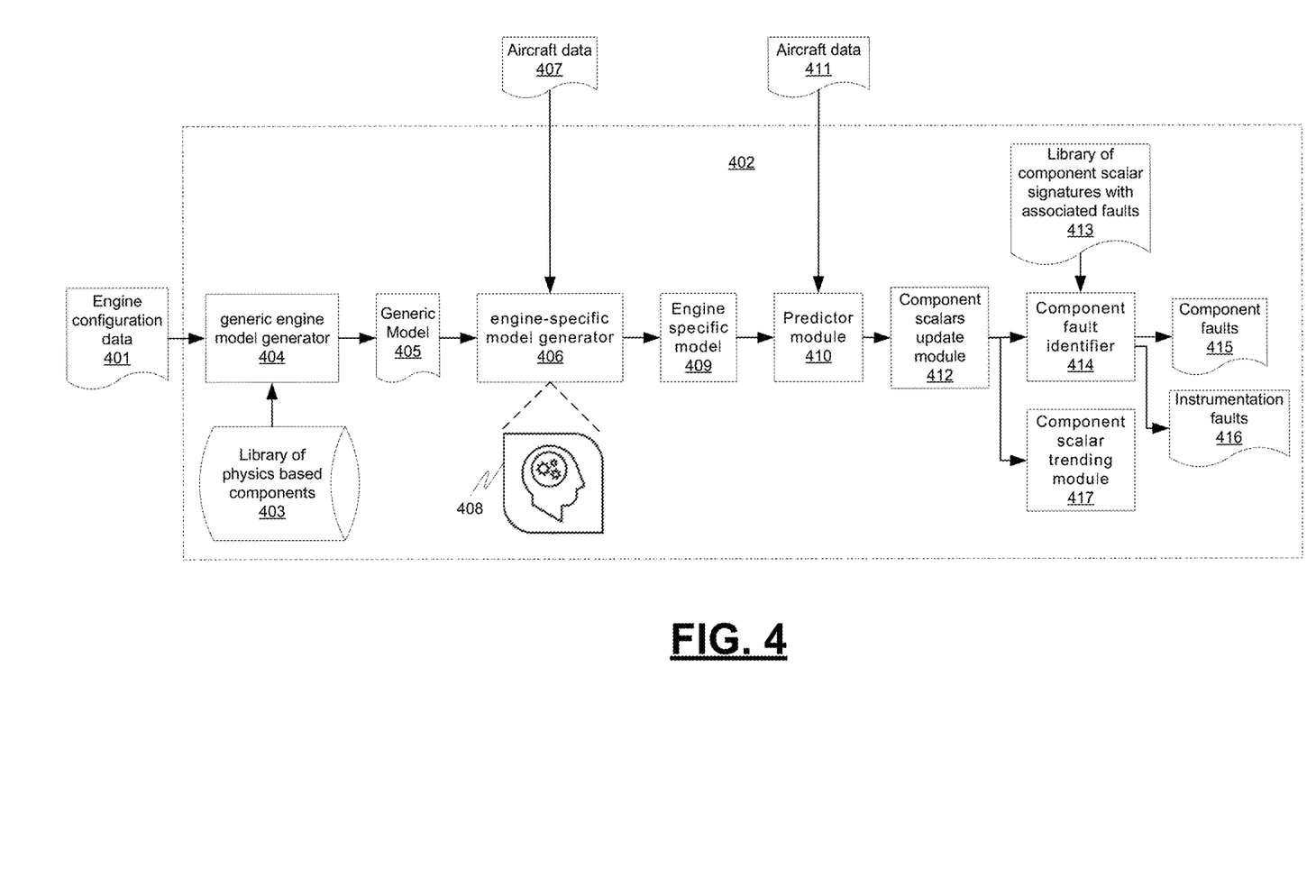
FIG. 4 is a block diagram depicting example modules in a self-generating engine health monitoring system, in accordance with some embodiments.

FIG. 4 is a block diagram depicting example modules in a self-generating engine health monitoring system 402. The example system 402 includes a generic engine model generator 404, an engine-specific model generator 406, a predictor module 410, a component scalar update module 412, a library of scalar signatures and the associated faults module 413, a component fault identifier module 414, identified component faults 415 and/or instrumentation faults 416, and a component scalar trending module 417. The example self-generating engine health monitoring system 402 includes one or more processors configured by programming instructions encoded on non-transient computer readable media to implement the generic engine model generator 404, an engine-specific model generator 406, a predictor module 410, a component scalar update module 412, a library of scalar signatures and the associated faults module 413, a component fault identifier module 414, identified component faults 415 and/or instrumentation faults 416, and a component scalar trending module 417.

The processor may be any custom-made or commercially available processor, a central processing unit (CPU), a graphics processing unit (GPU), an application specific integrated circuit (ASIC), a field programmable gate array (FPGA), an auxiliary processor among several processors associated with the self-generating engine health monitoring system 402, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of many known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the self-generating engine health monitoring system 402. The processors and memory of the example system 402 are configured by the executable programming instructions to provide the generic engine model generator 404, an engine-specific model generator 406, a predictor module 410, a component scalar update module 412, a library of scalar signatures and the associated faults module 413, a component fault identifier module 414, identified component faults 415 and/or instrumentation faults 416, and a component scalar trending module 417. The instructions may include one or more separate programs, each of which includes an ordered listing of executable instructions for implementing logical functions.

The generic engine model generator 404 is configured to generate a generic engine model 405 that includes a generic aero-thermal physics-based model for each of a plurality of engine components in a specific engine in the vehicle. The generic engine model generator 404 may be provided with engine configuration data 401 such as the number, type, size, and layout of the engine components in the vehicle. For example, the generic engine model generator 404 may be provided with the number of gear boxes, compressor stages, combustors, bleed ports, and turbine stages and the available level of instrumentation. The engine components may include a fan, propeller, gear box, compressor, combustor, turbine, ducts, nozzle, shaft, secondary flow, bleeds, and other engine components. The generic physics-based model for the plurality of engine components may include a performance map for simulating engine component operation that generates key parameters based on the state of a system of performance maps for the plurality of engine components. The performance map may include non-linear, non-empirical component models generated with any of a number of theoretical or empirical-based component aero-thermal design tools and without experimental or test data related to the engine. The generic physics-based model for each of a plurality of engine components may be selected from a library of physics-based component models 403.

The engine-specific model generator 406 is configured to receive a plurality of aircraft/engine data 407 including observed engine component parameters for each of the plurality of engine components and a plurality of observed environmental parameters captured during one or more pre-planned training missions and train an engine-specific model 409 using the plurality of observed engine component parameters and the plurality of environmental parameters captured during the one or more pre-planned training missions, wherein the engine-specific model 409 includes an engine-specific physics-based model/map for each of the plurality of engine components in the specific engine. Each engine-specific physics-based model for an engine component is configured for use in predicting one or more engine component parameters, either onboard the aircraft or off-board, in real-time or after the fact, based on observed environmental parameters, such as altitude, temperature, airspeed, weather data and more, captured during an operational mission performed by the aircraft. The training may include generating an engine-specific, physics-based component model for each specific component in the specific engine by adjusting the generic physics-based model for the specific component using the observed engine component parameters 407 for the specific component and captured environmental parameters 407. The adjusting includes generating sets of scalars for the component maps. The training includes using artificial intelligence 408 or machine learning techniques to generate an engine-specific, physics-based component model for each specific component.

After training, the predictor module 410, using the engine-specific physics-based component models 409 and aircraft environmental data 411 captured during an operational mission, is configured to predict specific engine component parameters. The component scalar update module 412 is configured to update engine-specific model component scalars based on the predicted specific engine component parameters.

The component fault identifier module 414 is configured to identify a specific engine component for maintenance action (e.g., by identifying a component fault 415 and suggesting maintenance actions). The component fault identifier module 414 is configured to identify a specific engine component for maintenance action when one or more observed engine component scalars updated by the scalar update module 412 match a specific set of component scalar signatures found in the library of component scalar signatures with associated faults 413. The degree of agreement at a pre-determined amount may trigger various degrees of indicated component faults 415 or instrumentation faults 416 and an associated level of maintenance action to be performed. Regardless of whether the severity of the component scalar change is sufficient to trigger a maintenance action, the component scalar trending module 417 tracks component scalars trending versus time and event.

Figure 5:
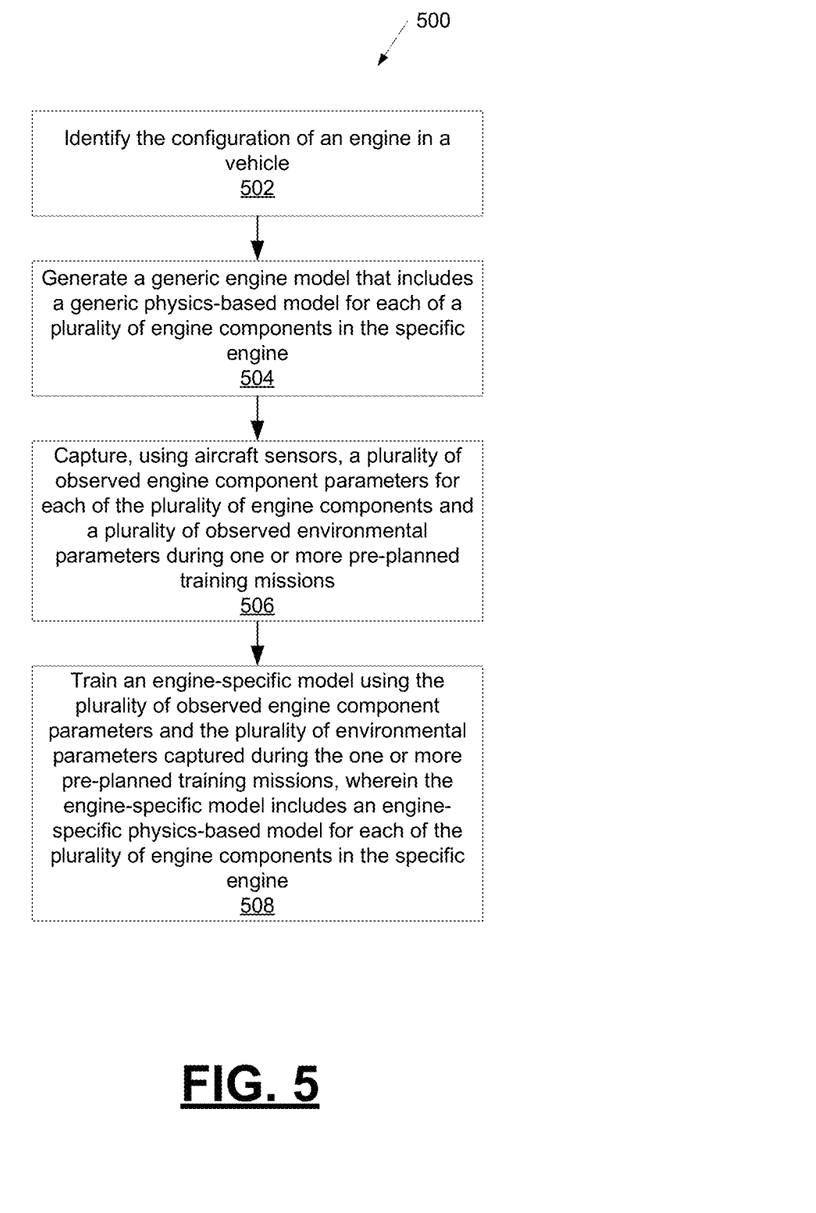
FIG. 5 is a process flow chart depicting an example process in an example self-generating engine health monitoring system, in accordance with some embodiments.

FIG. 5 is a process flow chart depicting an example process 500 in an example self-generating engine health monitoring system. The order of operation within the process is not limited to the sequential execution as illustrated in the figure, but may be performed in one or more varying orders as applicable and in accordance with the present disclosure.

The example process 500 includes identifying the configuration of an engine in a vehicle (operation 502). The identifying includes identifying engine components in the engine. The identifying may include identifying the number, type, size, and layout of the engine components in the vehicle. The identifying may include determining the number of gear boxes, compressor stages, combustors, bleed ports, and turbine stages and the available level of instrumentation.

The example process 500 includes generating a generic engine model that includes a generic aero-thermal physics-based model for each of a plurality of engine components in the specific engine (operation 504). The engine components may include a fan, propeller, gear box, compressor, combustor, turbine, ducts, nozzle, shaft, secondary flow, bleeds, and other engine components. The generic physics-based model for the plurality of engine components may include a performance map for simulating engine component operation that generates key parameters based on the state of a system of performance maps for the plurality of engine components. The performance maps may include non-linear, non-empirical component models generated with any of a number of theoretical or empirical-based component aero-thermal design tools and without experimental or test data related to the engine. The generic physics-based models for the engine components may be selected from a library of physics-based component models.

The example process 500 includes capturing, using aircraft sensors, a plurality of observed engine component parameters for each of the plurality of engine components and a plurality of observed environmental parameters during one or more pre-planned training missions (operation 506). Types of aircraft sensors may include airspeed, altitude, temperature, and other sensors. Types of observed engine component parameters may include speeds, temperatures, pressures, flows, fuel flow, torque. Types of observed environmental parameters may include altitude, inlet temperature, weather data, and more.

The example process 500 includes training, using a processor, an engine-specific model using the plurality of observed engine component parameters and the plurality of environmental parameters captured during the one or more pre-planned training missions wherein the engine-specific model includes an engine-specific physics-based model for each of the plurality of engine components in the specific engine (operation 508). Each engine-specific physics-based model for an engine component is configured for use in predicting one or more engine component parameters using a second plurality of observed environmental parameters captured using aircraft sensors during an operational mission performed by the vehicle. The one or more predicted engine component parameters may include efficiency, flows, pressure rise, and more. The training includes generating an engine-specific, physics-based component model/map for each specific component in the specific engine by adjusting the generic physics-based model for the specific component using observed engine component parameters for the specific component and captured environmental parameters. The adjusting may include generating sets of scalars for the component maps. The training may be performed using artificial intelligence or machine learning techniques to generate an engine-specific, physics-based component model for each specific component.

The example process 500 may further include capturing a second plurality of observed engine component parameters and a second plurality of observed environmental parameters during an operational mission performed by the vehicle and predicting a plurality of engine component parameters using the second plurality of observed environmental parameters and the engine-specific, physics-based component models for the specific components in the specific engine. The example process 500 may further include comparing the predicted engine component parameters with the second plurality of observed engine component parameters and identifying a specific component for maintenance action when one or more of the second plurality of observed engine component parameters related to the specific component deviates from predicted engine component parameters for the specific component by a predetermined amount.

The subject matter described herein provides apparatus, systems, methods, and techniques for self-generating an engine-specific health monitoring model from a generic model base. The subject matter described herein discloses apparatus, systems, methods, and techniques wherein an initial engine-specific model can be quickly created in an initial learning mode and real physical engine conditions can then be continuously compared to the engine-specific model in a diagnostic mode to detect anomalies in engine/component performance. The subject matter described herein discloses apparatus, systems, methods, and techniques wherein no rig maps may be necessary. Each representative map in the model is flexible and is scaled in relation to itself and to the data. The subject matter described herein discloses apparatus, systems, methods, and techniques wherein the system does not rely on absolute values but instead on deltas, or "lapse rate effects." The subject matter described herein discloses apparatus, systems, methods, and techniques for generating models that work with gas turbine engines from different manufacturers and that work with different gas turbine models from different or the same manufacturer.

In one embodiment, a method for self-generating engine-specific models in an engine health monitoring system is provided. The method comprises identifying the configuration of an engine in a vehicle, wherein the identifying includes identifying engine components in the engine; generating, using a processor, a generic engine model comprising a generic physics-based model for each of a plurality of engine components in the specific engine; capturing, using aircraft sensors, a plurality of observed engine component parameters for each of the plurality of engine components and a plurality of observed environmental parameters during one or more pre-planned training missions; and training, using a processor, an engine-specific model using the plurality of observed engine component parameters and the plurality of environmental parameters captured during the one or more pre-planned training missions, wherein the engine-specific model comprises an engine-specific physics-based model for each of the plurality of engine components in the specific engine. Each engine-specific physics-based model for an engine component is configured for use in predicting one or more engine component parameters using a second plurality of observed environmental parameters captured using aircraft sensors during an operational mission performed by the vehicle. The engine health monitoring system is also configured to identify a specific engine component for maintenance action when one or more of a second plurality of observed engine component parameters related to the specific engine component and captured using aircraft sensors during the operational mission deviates from predicted engine component parameters for the specific engine component during the operational mission by a predetermined amount.

These aspects and other embodiments may include one or more of the following features. The identifying the configuration of an engine may comprise identifying the number, type, size, and layout of the engine components in the vehicle. The identifying the configuration of an engine may comprise determining the number of gear boxes, compressor stages, combustors, bleed ports, and turbine stages and the available level of instrumentation. The engine components may include a fan, propeller, gear box, compressor, combustor, turbine, ducts, nozzle, shaft, secondary flow, bleeds, and other engine components. The generic physics-based model for each of a plurality of engine components in the specific engine may comprise a performance map for simulating engine component operation that generates key parameters based on the state of a system of performance maps for the plurality of engine components. The performance maps may comprise non-linear, non-empirical component models generated with a theoretical or empirical-based component aero-thermal design tool and without experimental or test data related to the engine. The generic physics-based models may be selected from a library of physics-based component models. The training may comprise generating an engine-specific, physics-based component model for each specific component in the specific engine by adjusting the generic physics-based model for the specific component using observed engine component parameters for the specific component and captured environmental parameters, wherein the adjusting may include generating sets of scalars for the component maps. The training may comprise using artificial intelligence or machine learning techniques to generate an engine-specific, physics-based component model for each specific component. The method may further comprise capturing a second plurality of observed engine component parameters and a second plurality of observed environmental parameters during an operational mission performed by the vehicle and predicting a plurality of engine component parameters using the second plurality of observed environmental parameters and the engine-specific, physics-based component models for the specific components in the specific engine. The method may further comprise comparing the predicted engine component parameters with the second plurality of observed engine component parameters and identifying a specific component for maintenance action when one or more of the second plurality of observed engine component parameters related to the specific component deviates from predicted engine component parameters for the specific component by a predetermined amount.

In another embodiment, a system for self-generating an engine-specific model in an engine health monitoring system is provided. The system comprises a generic engine model generator and a specific engine model generator. The generic engine model generator comprises one or more processors configured by programming instructions on computer readable media to generate a generic engine model comprising a generic physics-based model for each of a plurality of engine components in a specific engine in the vehicle. The specific engine model generator comprises one or more processors configured by programming instructions on computer readable media to: receive a plurality of observed engine component parameters for each of the plurality of engine components and a plurality of observed environmental parameters captured during one or more pre-planned training missions; and train an engine-specific model using the plurality of observed engine component parameters and the plurality of environmental parameters captured during the one or more pre-planned training missions, wherein the engine-specific model comprises an engine-specific physics-based model for each of the plurality of engine components in the specific engine. Each engine-specific physics-based model for an engine component is configured for use in predicting one or more engine component parameters using a second plurality of observed environmental parameters captured during an operational mission performed by the vehicle. The engine health monitoring system is configured to identify a specific engine component for maintenance action when one or more of a second plurality of observed engine component parameters related to the specific engine component and captured during the operational mission deviates from predicted engine component parameters for the specific engine component during the operational mission by a predetermined amount.

These aspects and other embodiments may include one or more of the following features. The generic engine model generator may be further configured to receive information identifying the configuration of the engine which includes information identifying the number, type, size, and layout of the engine components in the vehicle. The information identifying the configuration of the engine may comprise the number of gear boxes, compressor stages, combustors, bleed ports, and turbine stages and the available level of instrumentation. The engine components may include a fan, propeller, gear box, compressor, combustor, turbine, ducts, nozzle, shaft, secondary flow, bleeds, and other engine components. The generic physics-based model for each of a plurality of engine components in the specific engine may comprise a performance map for simulating engine component operation that generates key parameters based on the state of a system of performance maps for the plurality of engine components. The performance maps may comprise non-linear, non-empirical component models generated with a theoretical or empirical-based component aero-thermal design tool and without experimental or test data related to the engine. The generic physics-based models may be selected from a library of physics-based component models. The specific engine model generator may be configured to train an engine-specific model by adjusting the generic physics-based model for the specific component using observed engine component parameters for the specific component and captured environmental parameters. The adjusting may include generating sets of scalars for the component maps. The specific engine model generator may be configured to train an engine-specific model using artificial intelligence or machine learning techniques to generate an engine-specific, physics-based component model for each specific component.

In another embodiment, a method for monitoring engine health, comprises: determining the configuration of a specific engine in a vehicle; generating a generic engine model comprising a generic physics-based model for each of a plurality of engine components in the specific engine; capturing a plurality of observed engine component parameters for each of the plurality of engine components and a plurality of observed environmental parameters during one or more pre-planned training missions; training an engine-specific model using the plurality of observed engine component parameters and the plurality of environmental parameters captured during the one or more pre-planned training missions, wherein the training comprises generating an engine-specific, physics-based component model for each specific component in the specific engine by adjusting the generic physics-based model for the specific component using observed engine component parameters for the specific component and captured environmental parameters, and wherein the adjusting includes generating sets of scalars for component maps. The method further comprises capturing a second plurality of observed engine component parameters and a second plurality of observed environmental parameters during an operational mission performed by the vehicle; predicting a plurality of engine component parameters using the second plurality of observed environmental parameters and the engine-specific, physics-based component models for the specific components in the specific engine; comparing the predicted engine component parameters with the second plurality of observed engine component parameters; and identifying a specific component for maintenance action when one or more of the plurality of the second plurality of observed engine component parameters related to the specific component deviates from predicted engine component parameters for the specific component by a predetermined amount.

These aspects and other embodiments may include one or more of the following features. The generic physics-based model for each of a plurality of engine components in the specific engine may comprise a performance map for simulating engine component operation and wherein the performance maps comprise non-linear, non-empirical component models generated with a theoretical or empirical-based component aero-thermal design tool and without experimental or test data related to the engine.

Those of skill in the art will appreciate that the various illustrative logical blocks, modules, circuits, and algorithm steps described about the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for self-generating an engine-specific model in an engine health monitoring system, the method comprising:
    identifying a plurality of different types of engine components in an engine in an aircraft and a component layout for the engine;
    retrieving a plurality of physics-based component mapping forms from a library of physics-based components that correspond to the identified engine components;
    forming a generic engine model based on the identified component layout and the retrieved plurality of physics-based component mapping forms for the plurality of different types of engine components;
    capturing, using aircraft sensors, a plurality of observed engine component parameters for each of the plurality of engine components and a plurality of observed environmental parameters for the aircraft operating environment during one or more pre-planned training missions;
    applying artificial intelligence and machine learning techniques to train an engine-specific model using the plurality of observed engine component parameters and the plurality of environmental parameters captured during the one or more pre-planned training missions, wherein the engine-specific model is trained through tuning the plurality of physics-based component mapping forms to provide outputs that match the observed engine component parameters under the captured environmental parameter;
    wherein each of the plurality of tuned physics-based component mapping forms is configured for use in predicting one or more engine component parameters using a second plurality of observed environmental parameters captured using aircraft sensors during an operational mission performed by the aircraft; and
    applying the engine health monitoring system to identify a specific engine component for maintenance action when one or more of a second plurality of observed engine component parameters related to the specific engine component and captured using aircraft sensors during the operational mission deviates from predicted engine component parameters for the specific engine component during the operational mission by a predetermined amount.

2. The method of claim 1, wherein the identifying the plurality of engine components and the component layout for the engine comprises identifying a number, type, size, and layout of the engine components in the aircraft.

3. The method of claim 2, wherein the identifying the plurality of engine components and the component layout for the engine comprises determining a number of gear boxes, compressor stages, combustors bleed ports, and turbine stages and an available level of instrumentation.

4. The method of claim 1, wherein the engine components include a gear box, compressor, combustor, turbine, ducts, nozzle, shaft, secondary flow, and bleeds.

5. The method of claim 1, wherein the plurality of physics-based component mapping forms comprises a performance map for simulating engine component operation that generates key parameters based on a state of a system of performance maps for the plurality of engine components.

6. The method of claim 5, wherein the performance maps comprise non-linear, non-empirical component models generated with a theoretical or empirical-based component aero-thermal design tool and without experimental or test data related to the engine.

7. The method of claim 1, wherein the applying artificial intelligence and machine learning techniques to train an engine-specific model comprises generating sets of scalars for the plurality of physics-based component mapping forms.

8. A system for self-generating an engine specific model in an engine health monitoring system, comprising one or more processors configured by programming instructions encoded on non-transitory computer readable media to:
    generate a generic engine model comprising a plurality of physics-based component mapping forms from a library of physics-based components that correspond to a plurality of different types of engine components in a specific engine in an aircraft;
    receive a plurality of observed engine component parameters for each of the plurality of engine components and a plurality of observed environmental parameters for the aircraft operating environment captured during one or more pre-planned training missions; and
    apply artificial intelligence and machine learning techniques to train an engine-specific model using the plurality of observed engine component parameters and the plurality of environmental parameters captured during the one or more pre-planned training missions, wherein the engine-specific model is trained through tuning the plurality of physics-based component mapping forms to provide outputs that match the observed engine component parameters under the captured environmental parameters;

wherein each of the plurality of tuned physics-based component mapping forms is configured for use in predicting one or more engine component parameters using a second plurality of observed environmental parameters captured during an operational mission performed by the aircraft; and apply the engine health monitoring system to identify a specific engine component for maintenance action when one or more of a second plurality of observed engine component parameters related to the specific engine component and captured during the operational mission deviates from predicted engine component parameters for the specific engine component during the operational mission by a predetermined amount.

9. The system of claim 8, wherein the generic engine model generator is further configured to receive information identifying the configuration of the engine which includes information identifying a number, type, size, and layout of the engine components in the vehicle.

10. The system of claim 9, wherein the information identifying the configuration of the engine comprises a number of compressor stages, combustors, bleed ports, and turbine stages and an available level of instrumentation.

11. The system of claim 8, wherein the engine components include a gear box, compressor, combustor, turbine, ducts, nozzle, shaft, secondary flow, and bleeds.

12. The system of claim 8, wherein the plurality of physics-based component mapping forms comprises a performance map for simulating engine component operation that generates key parameters based on a state of a system of performance maps for the plurality of engine components.

13. The system of claim 12, wherein the performance maps comprise non-linear, non-empirical component models generated with a theoretical or empirical-based component aero-thermal design tool and without experimental or test data related to the engine.

14. The system of claim 8, wherein to train an engine-specific model the one or more processors are configured to generate sets of scalars for the plurality of physics-based component mapping forms.

15. A non-transitory computer readable media encoded with programming instructions configurable to cause one or more processors in an engine health monitoring system on an aircraft to perform a method, the method comprising:

identifying a plurality of different types of engine components in an engine in an aircraft and a component layout for the engine;

retrieving a plurality of physics-based component mapping forms from a library of physics-based components that correspond to the identified engine components;

forming a generic engine model based on the identified component layout and the retrieved plurality of physics-based component mapping forms for the plurality of different types of engine components;

capturing, using aircraft sensors, a plurality of observed engine component parameters for each of the plurality of engine components and a plurality of observed environmental parameters for the aircraft operating environment during one or more pre-planned training missions; and applying artificial intelligence and machine learning techniques to train an engine-specific model using the plurality of observed engine component parameters and the plurality of environmental parameters captured during the one or more pre-planned training missions, wherein the engine-specific model is trained through tuning the plurality of physics-based component mapping forms to provide outputs that match the observed engine component parameters under the captured environmental parameters;

wherein each of the plurality of tuned physics-based component mapping forms is configured for use in predicting one or more engine component parameters using a second plurality of observed environmental parameters captured using aircraft sensors during an operational mission performed by the aircraft; and applying the engine health monitoring system to identify a specific engine component for maintenance action when one or more of a second plurality of observed engine component parameters related to the specific engine component and captured using aircraft sensors during the operational mission deviates from predicted engine component parameters for the specific engine component during the operational mission by a predetermined amount.

16. The non-transitory computer readable media of claim 15, wherein the identifying the plurality of engine components and the component layout for the engine comprises identifying a number, type, size, and layout of the engine components in the aircraft.

17. The non-transitory computer readable media of claim 16, wherein the identifying the plurality of engine components and the component layout for the engine comprises determining a number of gear boxes, compressor stages, combustors bleed ports, and turbine stages and an available level of instrumentation.

18. The non-transitory computer readable media of claim 15, wherein the plurality of physics-based component mapping forms comprises a performance map for simulating engine component operation that generates key parameters based on a state of a system of performance maps for the plurality of engine components.

19. The non-transitory computer readable media of claim 18, wherein the performance maps comprise non-linear, non-empirical component models generated with a theoretical or empirical-based component aero-thermal design tool and without experimental or test data related to the engine.

20. The non-transitory computer readable media of claim 15, wherein the applying artificial intelligence and machine learning techniques to train an engine-specific model comprises generating sets of scalars for the plurality of physics-based component mapping forms.

* * * * *